United States Patent
Feltz et al.

(10) Patent No.: US 6,613,705 B1
(45) Date of Patent: Sep. 2, 2003

(54) REDUCTION-STABLE CERAMIC SUBSTANCES

(75) Inventors: Addalbert Feltz, Deutschlandsberg (AT); Andreas Webhofer, Dellach (AT); Klaus-Dieter Aichholzer, Deutschlandsberg (AT)

(73) Assignee: Epcos Aktiengesellschaft, München (DE)

( * ) Notice: Subject to any disclaimer, the term of this patent is extended or adjusted under 35 U.S.C. 154(b) by 0 days.

(21) Appl. No.: 09/786,895

(22) PCT Filed: Sep. 2, 1999

(86) PCT No.: PCT/DE99/02780

§ 371 (c)(1),
(2), (4) Date: May 21, 2001

(87) PCT Pub. No.: WO00/15575

PCT Pub. Date: Mar. 23, 2000

(30) Foreign Application Priority Data

Sep. 10, 1998 (DE) .......................................... 198 41 487

(51) Int. Cl.$^7$ ............................................. C04B 35/468
(52) U.S. Cl. ........................ 501/32; 501/138; 501/139; 361/321.4; 361/321.5
(58) Field of Search ........................ 501/32, 138, 139; 361/321.4, 321.5

(56) References Cited

U.S. PATENT DOCUMENTS

| 5,264,403 A | 11/1993 | Abe et al. |
|---|---|---|
| 5,292,694 A | 3/1994 | Abe et al. |
| 5,304,521 A | 4/1994 | Abe et al. |
| 5,350,721 A | 9/1994 | Abe et al. |
| 5,458,981 A | 10/1995 | Abe et al. |
| 5,479,140 A | 12/1995 | Abe et al. |
| 5,485,132 A | 1/1996 | Abe et al. |
| 5,488,019 A | 1/1996 | Abe et al. |
| 5,493,262 A | 2/1996 | Abe et al. |
| 5,827,792 A * | 10/1998 | Fukuda et al. ............... 501/138 |
| 6,107,228 A * | 8/2000 | Sugimoto et al. ........... 501/139 |
| 6,184,165 B1 * | 2/2001 | Kawata ........................ 501/32 |

FOREIGN PATENT DOCUMENTS

| DE | 197 49 858 | 4/1999 |
|---|---|---|
| EP | 0 534 801 | 3/1993 |
| EP | 0 534 802 | 3/1993 |
| EP | 0 701 981 | 3/1996 |

OTHER PUBLICATIONS

Ohsato, et al.; "Microwave Dielectric Properties of the $Ba_{6-3x}(Sm_{1-y},R_y)_{8+2x}Ti_{18}O_{54}$ (R=Nd and La) Solid Solutions with Zero Temperature Coefficient of the Resonant Frequency"; Japan Journal of Applied Physics; vol. 34 (Sep. 1995); pp. 5413–5417.

Laffez, et al.; "Microwave Dielectric Properties of Doped $Ba_{6-x}(Sm_{1-y},Nd_y)_{8+2x/3}Ti_{18}O_{54}$ Oxides"; Journal of Material Science; vol. 30;(1995;) pp. 267–273.

* cited by examiner

*Primary Examiner*—David Brunsman
(74) *Attorney, Agent, or Firm*—Schiff Hardin & Waite

(57) ABSTRACT

Reduction-stable COG ceramic compounds having a high dielectric constant, particularly for multi-layer capacitors or LC filters with Cu electrodes, on the basis of the material system $BaO$—$Nd_2O_3$—$Sm_2O_3$—$TiO_2$ in the region of the phase formation of rhombic bronzes with additives of a glass frit from the systems:

(A) $ZnO$—$B_2O_3$—$SiO_2$,
(B) $K_2O$—$Na_2O$—$BaO$—$Al_2O_3$—$ZrO_2$—$ZnO$—$SiO_2$—$B_2O_3$ or
(C) $Li_2O$—$BaO$—$B_2O$—$SiO_2$, have the general formula $Ba''_{6-x}(Sm_y Nd_{1-y})_{8+2x/3}Ti_{18}O_{54}$+p wt. % glass frit with $1<x<2$, $0.5<y<1.0$ and $3<p<10$.

6 Claims, 2 Drawing Sheets

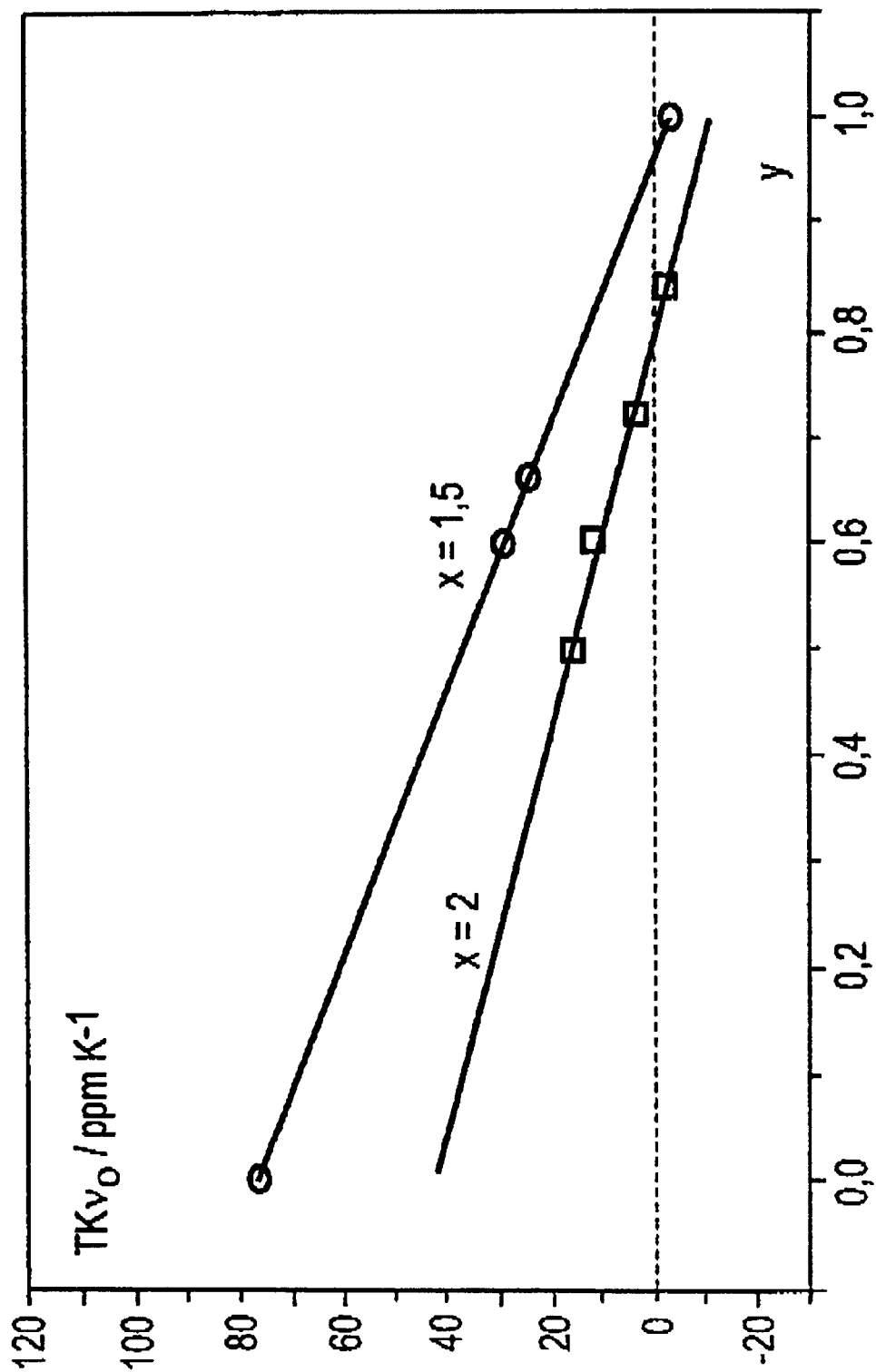

REDUCTION-STABLE CERAMIC SUBSTANCES

This application is a 371 of PCT/DE99/02780 filed Sep. 2, 1999.

BACKGROUND OF THE INVENTION

1. Field of the Invention

The present invention pertains to reduction-stable COG ceramic compounds having a high dielectric constant.

2. Discussion of the Related Art

Such COG ceramic compounds are utilized, for example, in multi-layer capacitors and LC filters with copper electrodes and are suitable for applications in the high-frequency range. What are referred to as COG ceramic are compounds that have a low (<30 ppm/K) temperature coefficient of the capacitance.

In the case of materials with a low dielectric constant DK, technical solutions have already been disclosed that allow the common sintering of a ceramic compound with Cu electrodes under reducing conditions in that the sintering temperature is lowered below the melting temperature of the copper (1083° C.). Specific sintering aids, preferably additives of glass frit, whose material basis is systems containing lead oxide and/or bismuth oxide are applied. A partial oxygen pressure<$10^{-2}$ Pa must be applied in order to suppress the oxidation of the copper during the sintering in the region of 1000° C.

At the same time, a lower, critical limit value of the partial oxygen pressure dare not be downwardly transgressed since, otherwise, the ceramic or a constituent of the added glass frit is subjected to reduction, which necessarily leads to a lowering of the insulation resistance and to an unacceptable increase in the dielectric losses. The de-bindering of the green compact must be completely

REDUCTION-STABLE CERAMIC COMPOUNDS

The invention is directed to reduction-stable COG ceramic compounds having a high dielectric constant according to the preamble of patent claim 1.

Such COG ceramic compounds are utilized, for example, in multi-layer capacitors and LC filters with copper electrodes and are suitable for applications in the high-frequency range. What are referred to as COG ceramic are compounds that have a low (<30 ppm/K) temperature coefficient of the capacitance.

In the case of materials with a low dielectric constant DK, technical solutions have already been disclosed that allow the common sintering of a ceramic compound with Cu electrodes under reducing conditions in that the sintering temperature is lowered below the melting temperature of the copper (1083° C.). Specific sintering aids, preferably additives of glass frit, whose material basis is systems containing lead oxide and/or bismuth oxide are applied. A partial oxygen pressure<$10^{-2}$ Pa must be applied in order to suppress the oxidation of the copper during the sintering in the region of 1000° C. At the same time, a lower, critical limit value of the partial oxygen pressure dare not be downwardly transgressed since, otherwise, the ceramic or a constituent of the added glass frit is subjected to reduction, which necessarily leads to a lowering of the insulation resistance and to an unacceptable increase in the dielectric losses. The de-bindering of the green compact must be completely realized before the onset of the sintering in order to avoid a local downward transgression of this lower critical limit value.

The publications EP 0 534 802 A1, U.S. Pat. Nos. 5,264,403, 5,304,521, 5,350,721, 5,479,140, 5,493,262, 5,488,019 and 5,485,132 disclose ceramic compounds of the substance systems $BaO$—$TiO_2$—$SE_2O_3$ wherein the oxide of the rare earth metals $SE_2O_3$ can be partially replaced by $Bi_2O_3$ whose sinter compression already partly succeeds at 900° C. in that glass frit parts that contain CdO, PbO or $Bi_2O_3$ or glasses of the system $ZnO$—$B_2O_3$—$SiO_2$ are added. A common sintering with silver electrodes in air is thereby enabled. For a common sintering with copper electrodes under inert conditions, for example under nitrogen, the systems prove to be inadequately stable with respect to a partial reduction, which results in a lowering of the insulation resistance and increase in the losses.

The publications EP 0 534 801 A1, U.S. Pat. Nos. 5,458,981 and 5,292,694 have likewise protected BaO—$TiO_2$—$Se_2O_3$ ceramic compounds in combination with glass additives containing $B_2O_3$ and ZnO for the purpose of the common sintering with silver electrodes. In these cases, too, the de-bindering under air access prevents the combination with copper electrodes, so that there must be recourse to silver or silver/palladium alloys as electrode material. The advantage of a cost-beneficial application of silver electrodes is opposed by the disadvantage of great mobility, particularly at high temperature, this leading to migration effects and causing a deterioration of the dielectric properties as a result.

In the earlier German Patent Application 19749858.2, the material system $BaO$—$PbO$—$Nd_2O_3$—$TiO_2$ used for the manufacture of high-DK COG capacitors and microwave resonators in the region of the phase formation of rhombic bronzes $(Ba_{1-y}Pby[sic])_{6-x}Nd_{8+2x/3}Ti_{18}O_{54}$ with 0.6<x2.1 and 0<y<0.6 is made available for a sintering at temperatures<1030° C. and, thus, for the common sintering with Cu electrodes in that the sintering aid, preferably PbO-free glass frit having a specific composition is added and a complete de-bindering under nitrogen is achieved by the action of water steam at elevated temperature upon utilization of the steam reforming process known from petroleum processing. The matching of the temperature coefficient of the capacitance TKC or, respectively, of the temperature coefficient of the resonant frequency TKv0 to the tolerance limits valid for COG capacitors TKC<30 ppm/K or, respectively, LC filters with TKv0<10 ppm/K succeeds in that modifications of the composition of the ceramic compound are undertaken with additives of $Nd_2Ti_2O_7$ or of $Ba_{4.5}Sm_9Ti_{18}O_{54}$. It should be noted as a limitation to this technical solution that the stability of the ceramic is limited due to the PbO content, which requires an especially careful de-bindering and the avoidance of too low a partial oxygen pressure in the sintering. The two demands are linked to one another since, in particular, the unacceptable downward transgression of the critical partial oxygen pressure limit, caused, for instance, by slight organic residue constituents, must also be avoided locally. Otherwise, a eutectic Pb/Cu alloy forms which melts at 924° C., i.e. the electrodes dribble out.

Systems free of PbO and $Bi_2O_3$ prove suitable for avoiding such a disadvantage. Thus, for example, the ceramic $Ba_4(Sm_{0.6}Nd_{0.4})_{9.233}Ti_{18}O_{54}$ that can be presented by sintering at approximately 1400° C. is characterized by a TKv0=value of +9 ppm/K and a quality-frequency product Qv0=9000 (3 GHz) [P. Lafez, G. Desgardin, B. Raveau, J. Mater. Sc. 30 (1995) 267]. Comparable values are recited in the literature for the composition $Ba_{4.2}(Sm_{0.3}Nd_{0.7})_{9.2}Ti_{18}O_{54}$ [H. Ohsato, H. Kato, M. Mizuta, S. Nishigaki, T. Okuda, Jpn. J. Appl. Phys. 34 (1995) 5413]. For lowering the high sintering temperature required for ceramic compounds of the system $BaO-TiO_2-Nd_2O_3-Sm_2O_3$, EP 0 701 081 A1 proposes glass frit additives that contain PbO and even $GeO_2$, which is disadvantageous for the stability with respect to reduction for the reasons that have been presented.

The invention is based on the object of manufacturing COG ceramic compounds with optimally high dielectric constant on the basis of a substance system that is highly stable with respect to reduction and that allows a TKC value<30 ppm/K or a TKv0 value<ppm/K to be set dependent on the selected composition, and to also specify a sintering temperature that lies under the melting temperature of the copper and enables the sintered compression in the presence of inside copper electrodes upon preservation of the dielectric properties needed for COG multi-layer capacitors and LC filters.

This object is inventively achieved with a reduction-stable COG ceramic compound that comprises the features of patent claim 1.

Advantageous developments are recited in the subclaims. The advantage of the invention is comprised in utilizing the substance system $BaO-Nd_2O_3-Sm_2O_3-TiO_2$ used for the manufacture of COG capacitors and microwave resonators with a high DK in the region of the phase formation of rhombic bronzes $Ba_{6-x}(Sm_yNd_{1-y})_{8-2x/3}Ti_{18}O_{54}$ in that a TKC value<30 ppm/K is achieved in the series $Ba_{4.5}(Sm_yNd_{1-y})_9Ti_{18}O_{54}$ (x=1.5) for y=0.9 or, respectively, in the series $Ba_4(Sm_{0.7}Nd_{0.3})_{9.33}Ti_{18}O_{54}$ (x=2) for y=0.7 and in that a TKv0 value<10 ppm/K can be designationally set in the series $Ba_{4.5}(Sm_yNd_{1-y})_9Ti_{18}O_{54}$ (x=1.5) for y=0.9 or, respectively, in the series $Ba_4(Sm_{0.7}Nd_{0.3})_{9.33}Ti_{18}O_{54}$ (x=2) for y=0.8, and to simultaneously enable a sintering at temperatures<1030° C. and, thus, for the common sintering with Cu electrodes in that a sintering aid, preferably a glass frit having a specific composition, is added to such a ceramic powder.

It is also advantageous that, on the basis of the knowledge of the composition-dependency of the TKC or, respectively, TKv0 values in said series, a shift of the temperature coefficient toward positive or negative values caused by the additive of glass frit can be compensated by a designational change of the composition.

The advantage of the manufacturing method is comprised therein that the sinter compression is implemented in nitrogen given a partial oxygen pressure<$10^{-2}$ without the properties that are typical for COG capacitors and microwave ceramics and, thus, for LC filters being lost, for instance as a result of a partial reduction.

The complete de-bindering of the green compact succeeds in a temperature range below the inception of the sinter compression in that process known from petrochemicals for decomposing hydrocarbons or more highly condensed organic compounds as well to form carbon dioxide and hydrogen due to the influence of water steam at elevated temperature ("steam cracking") is transferred onto the ceramic process. For example, a slight, negative free enthalpy can be estimated from thermodynamic data for the decomposition of polyethylene glycol or polyacrylic acid as binder according to the reaction:

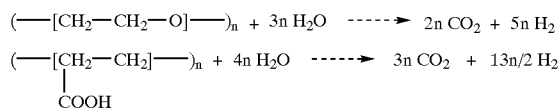

so that the process of de-bindering the green compacts, which must be undertaken for the purpose of avoiding an oxidation of the copper in nitrogen (partial oxygen pressure<$10^{-2}$ Pa), can completely occur.

The invention is explained in greater detail on the basis of the following exemplary embodiments.

BRIEF DESCRIPTION OF THE DRAWINGS

Corresponding to the general formula $Ba_{6-x}(Sm_yNd_{1-y})_{8+2x/3}Ti_{18}O_{54}$, the compositions of the ceramic compounds in the series x=1.5 and x=2 are varied as homogeneous mixed phases by variation of the y-value within the limits 0<y<1 corresponding to the dependency of the TKC value and of the TKv0 value shown in FIG. 1 and FIG. 2, and the composition parameter y is defined with a given value x=1.5 or x=2 with the objective that the criteria TKC<±30 ppm/K for COG capacitors and TKv0<10 ppm/K for LC filters are satisfied.

In a known way, the ceramic compound is produced after the mixing of the raw materials $BaCO_3$, $Nd_2O_3$, $Sm_2O_3$ and $TiO_2$ by calcining at 1250° C. with a holding time of at least 6 hours. For the purpose of acquiring comparison values, the conversion product without glass frit additive is subjected to a grinding process (average grain size approximately 0.6 μm), the obtained powder is subsequently converted into a granulate and the latter is compressed by pressing to form wafer-shaped specimens S or cylindrical bodies Z suitable for resonance measurements and these are sintered for 6–10 h at 1400° C.

Figure 1:
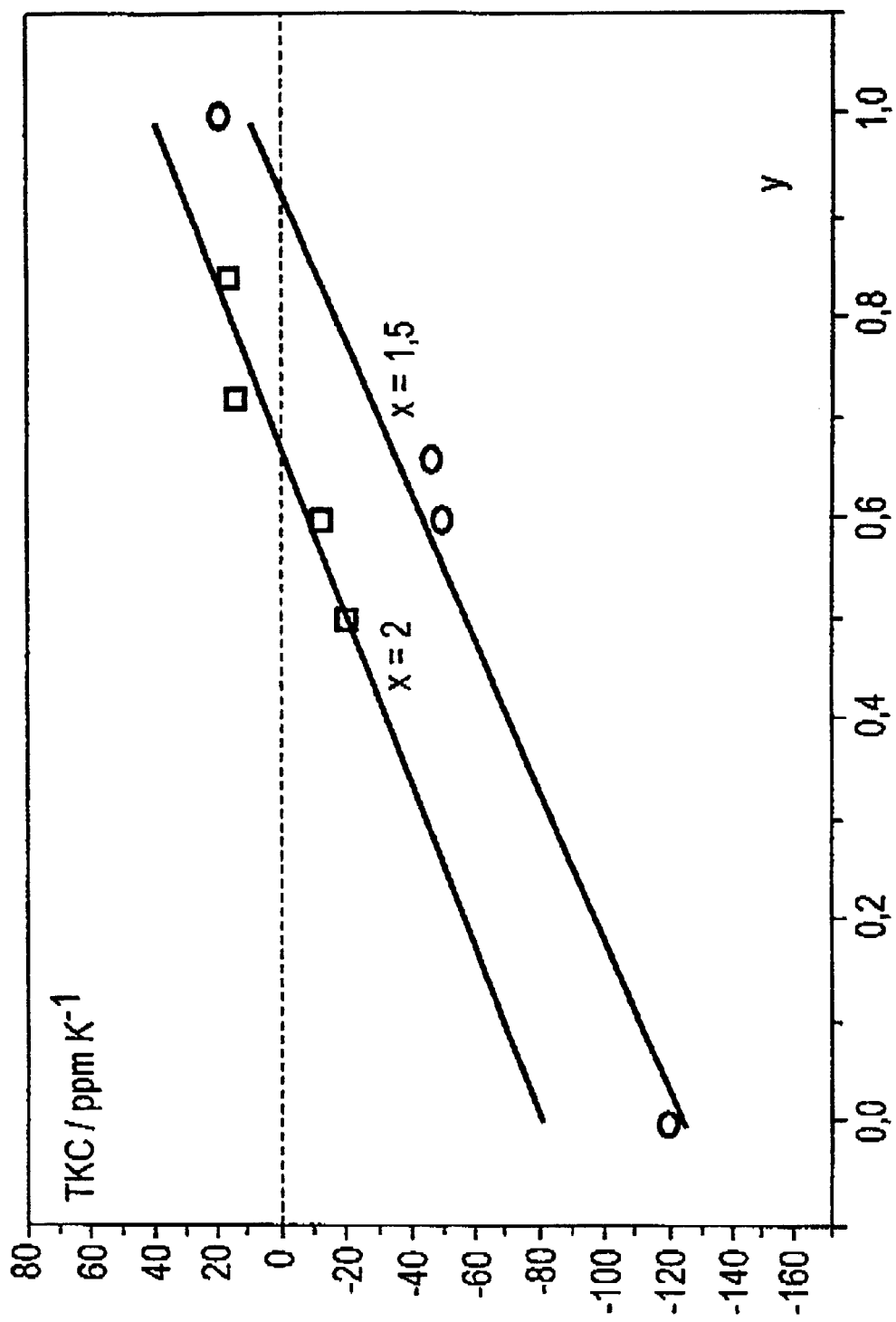

The properties of COG ceramic specimens $Ba_{6-x}(Sm_yNd_{1-y})_{8+2x/3}Ti_{18}O_{54}$ obtained by sintering at high temperature are recited in Table 1, namely for wafer-shaped specimens S having the dimensions ø12–13 mm, thickness 0.6–0.7 mm that were electrically measured in the region of 1 MHz after the application of Ag electrodes with Ag paste and stoving, and cylindrical specimens Z whose dielectric properties were determined electrode-free in the GHz range according to a resonance method. TKC value and TKv0 value are linked with one another via the temperature coefficient of the dielectric constant TK∈ and the coefficient of thermal expansion α according to the equations $$TKC = TK\in + \alpha$$

and $$TKv0 = -TK\in/2 - \alpha,$$

so that a conversion of the two quantities into one another is possible. Values between 6.6 and 8.1 ppm/K have been determined for the expansion coefficients $\alpha_{25-100°}$.

The property values reveal that the specimens 1 and 5 through 9 meet the criteria for COG capacitors and samples 5, 8 and meet the criteria placed on LC filters. The dielectric quality of the ceramic, recognizable with reference to the Qv0 value, turns out all the higher with increasing x-value the greater the relationship of $S_E2O_3$/BaO [sic] is in the phase composition.

Due to the absence of PbO, such ceramics assure an enhanced stability with respect to reduction in the sintering under inert conditions, for example in nitrogen.

tan δ and $TKC_{-25-85°C.}$ (ppm/K) (TKC) were measured at the wafer-shaped specimens C at respectively 1 MHz. Qv0 is recited in THz or, respectively, (GHz), TKv0.+25–+85° C. was, on the one hand, calculated (TKv0(b) from TKC and, on the other hand, measured (TKv0(g) at the specimens, namely in ppm/K. The values marked * were determined in the range +25–125° C.

TABLE 1

| Specimen | x | y | prel./% | $\epsilon$ | tan$\delta$ (S) | TKC (S) | Qv0 (Z) | TKv0 (b) | TKv0 (g) (Z) |
|---|---|---|---|---|---|---|---|---|---|
| 1 | 1 | 0,6 | 96,1 | 88 | $<1 \cdot 10^{-3}$ | +7 | 4,90 (4,61) | +9 | ? |
| 2 | 1,5 | 0 | — | 85,5 | $<1 \cdot 10^{-3}$ | -100 -111* | 7.68 (4,80) | +47 | +76 |
| 3 | 1,5 | 0,6 | 97,2 | 86,5 | $<1 \cdot 10^{-3}$ | -48 -50* | 8.95 (4,70) | +21 | +28.2 |
| 4 | 1,5 | 2/3 | 97,3 | 86,0 | $<1 \cdot 10^{-3}$ | -43 -47* | 7,85 (4,71) | +18 | +23.5 |
| 5 | 1,5 | 1 | 98,0 | 83,8 | $<1 \cdot 10^{-3}$ | +20 +22* | 8,19 (4,78) | -14 | -2.7 |
| 6 | 2 | 0,5 | 98,1 | 83,7 | $<1 \cdot 10^{-3}$ | -20* -24 | 10,77 (4,77) | +6 | +15,7 |
| 7 | 2 | 0,6 | 98,2 | 83,4 | $<1 \cdot 10^{-3}$ | -13* -13 | 10,70 (4,77) | +3 | +11,0 |
| 8 | 2 | 0,72 | 97,4 | 82,7 | $<1 \cdot 10^{-3}$ | +10* +13 | 10,56 (4,79) | -8 | +3,8 |
| 9 | 2 | 0,84 | 97,7 | 81,7 | $<1 \cdot 10^{-3}$ | +10* +15 | -9 (4,83) | -9 | +2,1 |

For common sintering with copper electrodes, a glass frit of the system (A) $ZnO$—$B_2O_3$—$SiO_2$, preferably having the specific composition $(ZnO)_{58.5}(B_2O_3)_{31.45}(SiO_2)_{10.05}$ or of the system (B) $K_2O$—$Na_2O$—$BaO$—$Al_2O_3$—$ZrO_2$—$ZnO$—$SiO_2$—$B_2O_3$, preferably having the specific composition $(K_2O)_{4.5}(Na_2O)_{3.5}(BaO)_{2.3}(Al_2O_3)_{2.1}(ZrO)_{2.9}(ZnO)_{4.4}(SiO_2)_{53.5}(B_2O_3)_{26.7}$ or of the system (C) $Li_2O$—$BaO$—$B_2O_3$—$SiO_2$, preferably having the specific composition $(Li_2O)_{7.0}(BaO)_{42.0}(B_2O_3)_{22.0}(SiO_2)_{29.0}$ is added in the range 3<p<10 m-% to the ceramic powder obtained by calcination at 1250° C., and the mixture in aqueous solution is subjected to a grinding process until an average grain size of 0.6 $\mu$m given an approximately monomodal distribution is achieved. After filtration and drying, the slip, upon addition of a pressing aid, is further-processed into a granulate from which wafer-shaped or cylindrical green compacts are pressed or, on the other hand after addition of a suitable organic binder system, is directly processed into films or, respectively, converted into a pressable granulate by spraying.

By applying Cu paste with silkscreening, the film is provided with a design intended for LC filters or, respectively, is provided with an electrode structure having a specific capacitance and shape suitable for COG capacitors, so that green parts that can be supplied for decarbonization and sintering are obtained after the stacking, laminating and cutting.

Wafer-shaped specimens S (ø12–13 mm, thickness 0.6–0.7 mm) or, respectively, cylindrical pressed bodies Z (ø10.0 mm, height 4.6 mm) provided with Cu electrodes prove suitable for determining the dielectric ceramic properties. The latter are sintered without electrodes for measurement in the GHz range.

Capacitors with inside Cu electrodes are measured in the embodiment 1206 (100 pF) and 0603 (20 pF). In LC filters, the quality given the ceramic properties determined at cylinder specimens is determined in the GHz range on the basis of the structure and the properties of the Cu electrode structure, so that exemplary embodiments for characterizing the ceramic are omitted at this point.

For de-bindering, the green compacts are exposed to a gas stream of pure nitrogen (2 through 5 l/min, residual partial oxygen pressure<$10^{-2}$ Pa) in a kiln with controlled atmosphere to which between 2 and 23 g water steam per hour are added. This is initially heated to 400° C., held for 2 hours, subsequently brought to 680 through 750° C., whereby the complete de-bindering takes a reaction time of up to 6 h. Subsequently, the delivery of water steam is reduced to about 1 g/h, and the sinter compression is implemented at 900 through 1000° C.

The outside Cu metallization of the COG capacitors, following the prescribed stoving curve of the appertaining copper paste, occurs in a separate process step, likewise under pure nitrogen in the presence of water steam, in order to avoid a reducing modification of the ceramic due to binder constituents contained in the paste.

Examples of reduction-stable COG ceramic specimens S (wafer-shaped) and Z (cylindrical) are recited in the following Tables 2, 3 and 4, these having been obtained on the basis of ceramic compounds of the compositions 7 (Table 2), 9 (Table 3) and 5 (Table 4 indicated in Table 1 upon addition of the glass frit (A), (B) or (C), whereby the glass frit content is respectively indicated in m-%. tan$\delta$ was determined at 1 MHz and Qv0 is recited in THz or, respectively, (GHz). TKC in the range ++25/125° C. and TKv0 in the range +25/55° C. (Table 3) or, respectively, +25/85° C. (Table 4) are recited in ppm/K. Sintering temperature T and sinter time t continue to be recited in ° C. and hours.

TABLE 2

| Specimen | T/t | prel/ % | $\epsilon$ | tan$\delta$ | TKC | Qv0 | TKv0 |
|---|---|---|---|---|---|---|---|
| S1/8% (A) | 975/6 | 97 | 58 | $<1 \cdot 10^{-3}$ | -30 | | |
| S2/8% (A) | 1000/6 | 99 | 61 | $<1 \cdot 10^{-3}$ | -29 | | |

TABLE 3

| Specimen | T/t | prel/ % | $\epsilon$ | tan$\delta$ | TKC | Qv0 | TKv0 |
|---|---|---|---|---|---|---|---|
| S3/8% (A) | 975 C/6 | 98 | 57 | $<1 \cdot 10^{-3}$ | -51 | | |
| S4/8% (A | 1000/6 | 98 | 57 | $<1 \cdot 10^{-3}$ | -25 | | |
| S5/6% (B) | 1030/6 | 96 | 55 | $<1 \cdot 10^{-3}$ | -38 | | |
| Z1/6% (A) (5, 54 | 1000/6 | 99 | 58 | | | 1.0 GHz) | -3.1 |
| Z2/6% (A) | 975/6 | 96 | 55 | | | 0.83 (5.65 GHz) | +4.8 |

TABLE 3-continued

| Specimen | T/t | prel/ % | ε | tanδ | TKC | Qv0 | TKv0 |
|---|---|---|---|---|---|---|---|
| Z3/6% (A) | 975/6 | 98 | 54 | | | 0.88 (5.94 GHz) | −7, 1 |

TABLE 4

| Specimen | T/t | prel/ % | ε | tanδ | TKC | Qv0 | TKv0 |
|---|---|---|---|---|---|---|---|
| S6/6% (A) | 1000/6 | 99 | 63 | $<1 \cdot 10^{-3}$ | +14 | | |
| S7/8% (B) | 1030/6 | 98 | 52 | $<1 \cdot 10^{-3}$ | −20 | | |
| S8*/6% (C) | 1030/6 | 98 | 72 | $<1 \cdot 10^{-3}$ | −46 | | |
| Z4/6% (A) | 1000/6 | 99 | 63 | | | 1.5 (5.7 GHz) | −8.9 |
| Z5/6% (A) | 980/1 | 98 | 61 | | | 2.2 (5.8 GHz) | −9.2 |
| Z6/8% (B) | 1030/6 | 98 | 52 | | | 1.4 (5.8 GHz) | −7.3 |
| Z7+/6% (C) | 1030/6 | 98 | 71 | | | 2.4 (5.2 GHz) | +5.9 |
| Z7*/6% (C) | 1030/6 | 98 | 72 | | | 1.5 (5.1 GHz) | −12.3 |
| Z7° /6% (C) | 1030/6 | 98 | 72 | | | 0.6 (5.1 GHz) | |

The specimens S1(A) and S2(A) illustrate that the admixture of 8% of the glass frit (A) to the ceramic compound 7 of table 1 already enables a sinter compression in the presence of Cu electrodes at 975° C., but a lowering of the TKC value from −13 ppm/K to −29 ppm/K thereby simultaneously occurs, so that the material properties demanded of a COG capacitor ceramic are still met in the limit region in conjunction with the low sintering temperature achieved and Cu electrodes. As anticipated, the DK value experiences a lowering compared to the glass-free ceramic, namely from 83 to approximately 60.

The same effect is observed given the specimens S3(A), S4(A) and S5(B) that are based on the ceramic compound 9 of Table 1. Proceeding from +15 ppm/K, the shift of the TKC value toward negative values caused by the interaction with the glass frit (A) or, respectively, (B) turns out greater here, so that the tolerance limit applying for COG capacitors is already transgressed. The shift effect is dependent on the composition of the glass and on the sintering temperature.

For the cylindrical specimens Z1(A) through Z3(A), which are likewise based on the ceramic compound 9 of Table 1, in contrast, TKv0 values that lie within the tolerance limit valid for radiofrequency applications, for example for LC filters, derive in the combination with glass (A). The quality-frequency product proves inadequate given these specimens. Proceeding from Qv0=10.5 THz at 4.83 GHz test frequency for the glass-free ceramic compound 9, the quality is reduced to values<1 THz due to the interaction with glass (A) at the sintering temperature and sintering time applied. These values lie below the tolerance limit of approximately 2 THz at a 5 GHz test frequency that is required for LC filters.

The specimens S6(A), S7(B) and S8*(C) as well as Z4(A), Z5(A), Z6(B) Z+7(C), Z7*(C) and Z7C(C) are respectively based on the ceramic compound 5 of Table 1 in the combination with glass (A), (B) and (C). The Nd-free compound, i.e. the compound containing only Sn2O3 [sic] as rare earth constituent, generally proves more kinetically stable with respect to the interaction with the glass frits as sintering aid.

Proceeding from a TKC value of +20 ppm/K for the ceramic compound 5, the admixture of 6% glass (A) only causes a decrease to +14 ppm/K when sintering the specimen S6(A) at 1000° C. A Qv0 value of 1.5 THz boosted compared to Z1(A) through Z3(A) (ceramic compound 9) is found for the quality-frequency product for the corresponding specimen; this, however, is still too low for LC filter applications.

The low sintering temperature of 1000° C., the relatively high DK value and the comparatively slight modification of the TKC value make the material combination ceramic 5 according to Table 1 with glass (A) seem advantageous for capacitors.

The fact that the drop in the quality-frequency product is based on a partial structural modification of the ceramic compound as a consequence of interaction with the glass friit [sic] is demonstrated by comparing specimen Z4(A) to specimen Z5(A). Reducing sintering temperature and time to 980° C. or, respectively, 1 h yield Qv=2 THz, whereby an even more favorable value for the temperature coefficient of the resonant frequency TKv0=−9.2 ppm/K is obtained.

The combination of the ceramic compound 5 with glass (B) in specimens S7(B) and Z6(B) proves less favorable. The sintering temperature must be raised to 1030° C., the TKC value is reduced from +20 ppm/K to −20 ppm/K and the quality-frequency product Qv0 turns out to be no higher than given the material combination of ceramic compound 5 with glass (A) given the same sintering time.

The combination of the ceramic compound 5 with glass (C) is most advantageous for LC filter applications. This advantage, however, only takes full effect when the glass corresponding to designation (C1000) was melted at only 1000° C. at fritted by quenching in water. A comparitively high TKv0 value of 2.5 THz at a 5.2 GHz test frequency that meets the demands applying for LC filters is only obtained—as specimen Z7(C1000) shows—then, even given a sintering temperature of 1030° C. and a sintering time of 6 h.

Melting glass (C) at 1100 (specimens S8*, Z7*) or, respectively, even less favorably, at 1200° C. (specimen Z7°) leads to a glass structure that triggers a significantly more highly degrading effect on the ceramic compound 5 $Ba_{4.5}Sm_9Ti_{18}O_{54}$. Specimen Z7+, in contrast, was obtained by melting glass at 1000° C.

Table 5 recites measured results that were obtained at capacitors K with Cu inside electrodes having a capacitance of approximately 100 pF (1206) with 4 Cu inside electrodes and approximately 20 pF with 7 Cu inside electrodes. They are based on the ceramic compound 5 of Table 1 in combination with 6% glass (A). The criteria valid for COG capacitors were met in view of the TKC value. The high insulation resistance RIs and the low tan δ value are to be emphasized. The latter was determined at 1 MHz and 100 or, respectively, 200 MHz. Further, the capacitors with Cu inside electrodes are distinguished by a comparatively low equivalent series resistance ESR. This was acquired with a measuring bridge (MB) at 500 MHz as well as by S-parameter measurement (S) at 1.1 GHz.

The HALT test (200° C./200 V) documents the operational dependability of the capacitors. An outage due to a drop of the insulation resistance below 70% of the initial value was not found under the indicated conditions. The following values derived for the model 1206:

$R_{Is,50\%} > 0.7 R_{Is,start}$ after 2550 min and $R_{Is,50\%} \geq 0.5 R_{Is,start}$ after 5300 min.

The capacitance C is recited in pF, the RKC in ppm/K and the insulation resistance Ris in MΩ. tan δ is recited for two different frequencies, whereas the ESR value is recited in mΩ.

TABLE 5

| Model | C | TKC | RIs | tan δ | tan δ | ESR (MB) | ESR (S) |
|---|---|---|---|---|---|---|---|
| 1206 | 106 ± 1 | +17 | 9 · 106 | 0.5 · $10^{-3}$ (1 MHz) | (4.2 ± 0.3) · $10^{-3}$ (100 MHz) | 163 ± 18 (500 MHz) | |
| 0603 | 26 ± 1 | +10 | 4 106 | 0.5 $10^{-3}$ (1 MHz) | (2.3 ± 0.2) · $10^{-3}$ (200 MHz) | 123 ± 13 (500 MHz) | 80 (1.1 GHz) |

What is claimed is:

1. A reduction-stable COG ceramic compound having a high dielectric constant, particularly for multi-layer capacitors or LC filters with Cu electrodes based on the material system $BaO$—$Nd_2O_3$—$Sm_2O_3$—$TiO_2$, comprising:
   a composition in the region of the phase formation of rhombic bronzes including additives of a glass frit from at least one of the following systems:
   (A) $ZnO$—$B_2O_3$—$SiO_2$
   (B) $K_2O$—$Na_2O$—$BaO$—$Al_2O_3$—$ZrO_2$—$ZnO$—$SiO_2$—$B_2O_3$, or
   (C) $Li_2O$—$BaO$—$B_2O$—$SiO_2$; and
   including the general formula $Ba_{6-x}(Sm_yNd_{1-y})_{8+2x/3}Ti_{18}O_{54}$+p wt. % glass frit with $1 \leq x \leq 2$, $0.5 \leq y \leq 1.0$ and $3 < p < 10$.

2. A reduction-stable ceramic compound according to claim 1, wherein the reduction stability of the COG ceramic compound is formed by a single-phase ceramic containing no additives of PbO or $Bi_2O_3$.

3. A reduction-stable ceramic compound according to claim 2, wherein the COG ceramic compound is set to temperature coefficients of the capacitance TKC<±30 ppm/K for COG capacitors, or to temperature coefficients of the resonant frequency TKv0<10 ppm/K for radio frequency applications by means of a suitable selection of composition parameters x and y of a single-phase ceramic.

4. A reduction-stable ceramic compound according to claim 3, wherein the COG ceramic compound comprises a phase-homogeneous structure that, by combining a defined structure with corresponding phase width, has a high value for the quality-frequency product and is suited for an application in the GHz range.

5. A reduction-stable ceramic compound according to claim 4, wherein the glass frits comprise:

$(ZnO)_{58.5}(B_2O_3)_{31.45}(SiO_2)_{10.05}$, $(K_2O)_{4.5}(Na_2O)_{3.5}(BaO)_{2.3}(Al_2O_3)_{2.1}(ZrO_2)_{2.9}(ZnO)_{4.4}(SiO_2)_{53.5}(B_2O_3)_{26.7}$ or $(Li_2O)_{7.0}(BaO)_{42.0}(B_2O_3)_{22.0}(SiO_2)_{29.0}$.

6. A reduction-stable ceramic compound according to claim 5, wherein the compound is used for COG capacitors or LC filters.

* * * * *